United States Patent Office

2,903,483
Patented Sept. 8, 1959

2,903,483

PROCESS FOR THE PRODUCTION OF AROMATIC HYDROXY ALDEHYDES

Carl Berres, Leverkusen, Germany, assignor to Farbenfabriken Bayer Aktiengesellschaft, Leverkusen, Germany, a corporation of Germany No Drawing. Application May 21, 1956
Serial No. 585,926

Claims priority, application Germany May 24, 1955

6 Claims. (Cl. 260—600)

This invention relates to a process for the production of aromatic hydroxy aldehydes.

It is known that by the action of hexamethylene tetramine on β-naphthol in the presence of glacial acetic acid, an azomethine is obtained which can be split into 2-hydroxy-1-naphthaldehyde and 1-aminomethyl-2-hydroxynaphthalene by heating with alcoholic hydrochloric acid (Duff, Journal of the Chemical Society, 1934, 1305). The yield of desired aldehyde which is theoretically possible by this method is 50% of the β-naphthol used, but in actual fact it is considerably lower owing to the reactions not proceeding quantitatively and the necessity of separating the two reaction products.

It is also known (Duff, Journal of the Chemical Society, 1934, 1307; 1941, 547; 1945, 276; 1951, 1512) that it is possible to obtain only small yields of the corresponding oxyaldehydes from phenols with free ortho- and para-positions to the hydroxy group, by heating said phenols with hexamethylene tetramine in the presence of glycerine-boric acid or ethoxyethanol-boric acid. This process is therefore not suitable for use on a technical scale, especially as the boric acid derivatives are not readily available.

It has now been found that aromatic hydroxyaldehydes can be obtained of sufficient purity and in good yield in one operation which can be carried out in a technically simple manner and does not involve the necessity of separating out undesirable secondary products if aromatic hydroxy compounds are reacted with hexamethylene tetramine and formaldehyde in acetic acid or its anhydride at elevated temperature, if desired in the presence of concentrated mineral acids.

When carrying out this process in practice, it has proved advantageous to use formaldehyde in the form of paraformaldehyde. It is also possible for hexamethylene tetramine to be replaced by a mixture acting in a similar manner and consisting of (a) ammonia or salts of ammonia with weak acids and (b) formaldehyde or paraformaldehyde. The ammonia and formaldehyde may be used in aqueous solution or in gaseous form. Instead of using acetic acid as the reaction medium, it is also possible to employ its closest homologues, such as propionic acid, butyric acid or valeric acid as well as lower polycarboxylic acids, but they are less suitable in practice, owing to either their odour or their solid state of aggregation or both.

Suitable starting materials are phenols and naphthols, which contain a total of not more than two reactive ortho- and/or para-positions in the nucleus carrying the hydroxyl group or groups i.e., is free from substituents in one or two of the three positions ortho and para to the hydroxyl group. The presence of more than two free ortho- and para-positions i.e., two unsubstituted ortho and an unsubstituted para position in the nucleus carrying the hydroxyl groups can be disadvantageous in carrying out the process according to the invention, since it is possible in these cases for an uncontrollable reaction to take place, and this reduces the yield. The phenols and naphthols can if necessary contain other substituents, such as methyl groups, carboxyl groups or halogen. 2,4-dichlorophenol, β-naphthol or the dihydroxynaphthalenes are examples of suitable starting materials.

In one embodiment of the process according to the invention, the aromatic hydroxy compound is mixed with hexamethylene tetramine and paraformaldehyde in glacial acetic acid, if necessary with addition of concentrated mineral acid. Based on the amount of the aromatic hydroxy compound an excess of formaldehyde is preferably used in the process of this invention. On the other hand smaller amounts of formaldehyde may be used as well. As reaction temperature a temperature within the range of 90–120° C. is preferably employed. In another embodiment of the process of the invention, the glacial acetic acid can be introduced dropwise into the melt of the components, the said melt being at water bath temperature.

The reaction mixture is worked up by running in concentrated mineral acid at water bath temperature and then the reaction mixture is mixed with a large excess of water. In most cases, the aldehyde formed crystallizes out on cooling and can be separated. Aldehydes which are more readily volatile can with advantage be isolated by steam distillation.

The process according to the invention enables yields of pure products to be produced which are greater than the initially mentioned 50% yields which are theoretically possible by the prior process and substantially greater than the yields actually obtained hitherto. The fact that the process can be carried out in a single stage and that no undesirable secondary products are produced enables aromatic hydroxyaldehydes to be produced economically.

The compounds obtainable by the process of the instant application can be used as intermediates, e.g. for the production of dyestuffs.

The present invention is further illustrated by the following examples without, in any way, limiting it thereto.

Example 1

300 parts of glacial acetic acid are slowly run into a melt consisting of 163 parts of 2,4-dichlorophenol, 75 parts of hexamethylene tetramine and 75 parts of paraformaldehyde, the addition taking place in approximately one hour while stirring and at a temperature of 100° C. 148 parts of sulfuric acid monohydrate are thereafter added slowly over a period of two hours at 118° C. Stirring is continued for a further 15 minutes at 118° C., the clear solution is then mixed with 3000 parts of hot water and allowed to cool while stirring. 3,5-dichloro-2-hydroxybenzaldehyde is obtained as practically white compact crystals with a yield of 140 parts. Melting point: 91° C. A completely pure product is obtained if the reaction mass is diluted with 3000 parts of hot water and subjected to steam distillation. 110–115 parts (58–60% of the theoretical) of a pure white product are obtained, the said product melting a 95° C.

The same yield is obtained if the glacial acetic acid is replaced by acetic anhydride.

Example 2

300 parts of glacial acetic acid are run into a melt of 122 parts of 2,4-dimethylphenol, 75 parts of hexamethylene tetramine and 125 parts of paraformaldehyde, this taking place at 100° C. and over a period of one hour; 344 parts of concentrated hydrochloric acid are added at 100° C. over another hour and the temperature is kept at 100° C. for a further 30 minutes. After diluting the reaction mass with water, the 3,5-dimethyl-2-hydroxybenzaldehyde is distilled over with steam. 97 parts (65% of the theoretical) of pure aldehyde are obtained, with the solidification point of 23° C.

2-hydroxy-5-methyl benzaldehyde, 2-hydroxy-3-methyl- 5-chlorobenzaldehyde and 2-hydroxy-3-chloro-5-methyl-benzaldehyde can also be obtained in a similar manner.

Example 3

A mixture of 288 parts of β-naphthol, 280 parts of hexamethylene tetramine, 50 parts of paraformaldehyde, 400 parts of glacial acetic acid and 350 parts of concentrated hydrochloric acid are heated for one hour on a boiling water bath while stirring. Another 390 parts of concentrated hydrochloric acid are then added and the mixture heated for a further 45 minutes on the water bath. On gradually adding 5000 parts of cold water to the reaction mass, there are obtained 288–291 parts (81.6–83.6% of the theoretical) of well crystallized 2-hydroxy-1-naphthaldehyde, melting point: 83.6° C.

Example 4

A mixture of 160 parts of 2,6-dihydroxynaphthalene, 350 parts of hexamethylene tetramine, 50 parts of paraformaldehyde, 600 parts of glacial acetic acid and 425 parts of concentrated hydrochloric acid is heated for 50 minutes on a boiling water bath. Another 490 parts of concentrated hydrochloric acid are then added and heating continued for a further 30 minutes at 100° C.

After adding 200 parts of hot water, the mixture is allowed to cool. 2,6-dihydroxynaphthalene-1,5-dialdehyde precipitates as fine light yellow crystals. The yield is 130 parts (60% of the theoretical). The aldehyde melts at 270° C. with decomposition. In a similar manner, 2,3-dihydroxynaphthalene-1,4-dialdehyde is obtained from 2,3-dihydroxynaphthalene, the former melting at 160° C. with decomposition.

Example 5

A mixture of 376 parts of 2-naphthol-3-carboxylic acid, 350 parts of hexamethylene tetramine, 150 parts of paraformaldehyde and 600 parts of glacial acetic acid is heated for 50 minutes on a boiling water bath. 900 parts of concentrated hydrochloric acid are then added and the mixture heated for a further 45 minutes at 100° C. On diluting the reaction mass with 8000 parts of water, 2-hydroxy-3-carboxy-1-naphthaldehyde is precipitated as a yellow crystalline powder with a yield of 335 parts (77% of the theoretical). The aldehyde decomposes at 280° C.

Example 6

410 parts of paraformaldehyde are introduced within 30 minutes at 20–25° C. and while cooling into 480 parts of aqueous ammonia (28.4% of the theoretical). The mixture is then heated for 10 minutes at 60° C., the paraformaldehyde being dissolved. After cooling at 40° C., 288 parts of β-naphthol and a mixture of 600 parts of glacial acetic acid and 350 parts of concentrated hydrochloric acid are added and the complete mixture heated for 1½ hours at 100° C. 390 parts of concentrated hydrochloric acid are introduced and heating continued for a further 45 minutes at 100° C. After dilution with 5000 parts of cold water, 300 parts of 2-hydroxyl-1-naphthaldehyde are obtained. The product melts at 80° C.

The same yield is obtained if 136 parts of gaseous ammonia are introduced while cooling into 1025 parts of aqueous formaldehyde solution (40%) and at the same time the quantity of glacial acetic acid is increased to 900 parts.

Example 7

300 parts of glacial acetic acid are run, over a period of one hour and at a temperature of 100° C., into a melt consisting of 77 parts of ammonium carbonate, 221 parts of paraformaldehyde and 122 parts of 2,4-dimethyl phenol; over another hour, 260 parts of concentrated hydrochloric acid are added at 100° C. and the temperature is kept for a further 30 minutes at 100° C. After diluting the reaction mass with water, 3,5-dimethyl-2-hydroxybenzaldehyde is distilled over with steam. There are obtained 88.5 parts (59% of the theoretical) of pure aldehyde with the solidification point of 23° C.

Approximately the same yield is obtained if the ammonium carbonate is replaced by 124 parts of ammonium acetate.

I claim:

1. A process for the production of aromatic hydroxy aldehydes which comprises reacting at a temperature within the range between 90° and 120° C. an aromatic hydroxy compound, wherein at least one of the positions ortho and para to the hydroxyl group in the ring carrying the hydroxyl group is occupied by a substituent and at least one of said positions is free, said substituent being a member selected from the group consisting of lower-alkyl radicals, carboxyl, chlorine and the carbon atom of a fused cyclic structure, with hexamethylene tetramine and formaldehyde, in the presence of a member selected from the group consisting of acetic acid and acetic anhydride and recovering the aromatic aldehyde from the reaction mixture.

2. A process as claimed in claim 1, wherein the reaction is carried out in the presence of a concentrated mineral acid.

3. A modification of the process claimed in claim 1, wherein paraformaldehyde is used in place of formaldehyde.

4. A modification of the process claimed in claim 1, wherein a mixture of (a) a member selected from the group consisting of ammonia and salts of ammonia with weak acids and (b) a member selected from the group consisting of formaldehyde and paraformaldehyde is used instead of hexamethylene tetramine.

5. A process for the production of 3,5-dichloro-2-hydroxy-benzaldehyde which comprises reacting at a temperature within the range of 90–120° C. 2,4-dichlorophenol with hexamethylene tetramine and formaldehyde in the presence of a concentrated mineral acid and acetic acid and recovering the 3,5-dichloro-2-hydroxy-benzaldehyde in known manner.

6. A process for the production of 2-hydroxy-1-naphthaldehyde which comprises reacting at a temperature of about 100° C. β-naphthol with hexamethylene tetramine and formaldehyde in the presence of a concentrated mineral acid and acetic acid and recovering the 2-hydroxy-1-naphthaldehyde.

No references cited.